United States Patent [19]

Jimena

[11] 4,315,301
[45] Feb. 9, 1982

[54] GENERATOR FLASHLIGHT

[76] Inventor: Carlos L. Jimena, 327 Douglas St., Salt Lake City, Utah 84102

[21] Appl. No.: 155,217

[22] Filed: Jun. 2, 1980

Related U.S. Application Data

[63] Continuation-in-part of Ser. No. 951,783, Oct. 16, 1978, abandoned.

[51] Int. Cl.³ ............................................... B62J 5/08
[52] U.S. Cl. ................................. 362/193; 362/202
[58] Field of Search .............................. 362/193, 202

[56] References Cited

U.S. PATENT DOCUMENTS 2,424,700   7/1947   McMath ............................. 362/192
3,345,507  10/1967   Messinger .......................... 362/192

*Primary Examiner*—Stephen J. Lechert, Jr.
*Attorney, Agent, or Firm*—Thorpe, North, Western & Gold

[57] ABSTRACT

A self-generating hand-held flashlight including the optional use of battery power. The flashlight includes a tubular body case that may be divided into three compartments. In a first compartment a generator utilizing a permanent magnet armature is mounted. This generator is electrically tied to a bulb at one end of the flashlight. The generator is powered by rotation of a central shaft coupled to a flywheel, the flywheel being located within a second and larger compartment of the flashlight body case. The flywheel is rotated by manual energy coupled to the flywheel through a power wheel and slip-clutch, both of which are also located within the second and larger compartment. Various manual means are used to rotate the power wheel. The flywheel is adapted to have a maximum inertia, thereby allowing it to rotate for a substantial period of time once initialized. A very favorable time ratio of light time to energy input time is achieved by using a high inertia flywheel that is properly balanced and mounted within the flashlight. Hence, a continuous source of light may be provided through the application of only short bursts of manual input energy. A third compartment of the flashlight housing may optionally include a battery that could be used as an alternative power source.

15 Claims, 9 Drawing Figures

GENERATOR FLASHLIGHT

BACKGROUND OF THE INVENTION

This application is a continuation-in-part of application Ser. No. 951,783 filed Oct. 16, 1978, now abandoned.

This invention relates to hand-held flashlights, and more particularly to hand-held self-generating flashlights.

Flashlights that include built-in generator means are known in the art. For example, Pattay et al, U.S. Pat. No. 1,301,595 (1919) discloses a self-generating flashlight that includes a mechanism for turning the armature of a generator without the aid of a spring. In fact, two alternative methods are disclosed for turning the armature. The first is an alternating rocking arm, which is energized by rocking the flashlight back and forth; and the second means is a circular continuous movement crank. A French Pat. No. 520675 (1920) also discloses a mechanical flashlight that uses a pull cord as the driving mechanism to rotate the generator contained therein. It is also common to employ a spring driven generator within the flashlight. See, e.g., Speck, U.S. Pat. No. 3,099,402 (1963); Lehman, U.S. Pat. No. 2,490,309 (1949); Holmes, U.S. Pat. No. 2,232,605 (1941); Collins, U.S. Pat. No. 2,105,719 (1938); and Holmes, U.S. Pat. No. 2,092,845 (1937). Only the Speck patent, supra, discloses the combination of a spring driven generator flashlight that utilizes a battery or batteries as an alternative source of energy.

While spring driven generator flashlights are quite common in the prior art, the use of springs is not without problems. For one, the spring typically is quite bulky, and greatly increases the weight of a hand-held unit. Moreover, a fairly complex gearing system must generally be used to convert the spring energy to rotational energy of sufficient rpm to drive a generator that will light a flashlight.

As mentioned above, at least two of the known prior self-generating flashlights do not employ a spring-driven generator. In one disclosure (the French Pat. No. 520675), a pull cord is coupled to the armature of the generator. Thus, a quick pull of the pull-cord turns the armature of the flashlight, thereby generating light for a short period of time. Other methods known in the art include the alternating rocking arm or a crank (U.S. Pat. No. 1,301,595). Unfortunately, these non-spring driven approaches require continual input of manual energy in order to provide a constant source of light. Such continual input of energy is not only tiring to a user of the light, as specifically taught in Pattay et al, U.S. Pat. No. 1,301,595, (1919) at page 2 lines 100–10, but it also provides light for only a short period of time after the input of manual energy ceases. Thus, if a user stops rocking, cranking, or pulling on the light, as he might want to do for a few minutes in order to rest, the light will go out.

SUMMARY OF THE INVENTION

It is a principal object of the present invention to provide a hand-held self-generating flashlight that provides light for a relatively long period of time after application of a short burst of manual input energy, thereby allowing a user to generate a constant source of light without becoming overly tired.

A further object of the present invention is to provide such a self-generating flashlight that does not rely on spring driven means to drive the generator thereof.

An additional object of the present invention is to provide a self-generating hand-held flashlight that is lightweight, and that also includes a battery that can be used to provide light when the self-generating means is not employed.

The above and other objects, features, and advantages of the invention are realized in an illustrative embodiment that includes a flashlight housing in which a light is mounted in one end thereof. The housing includes a battery storage compartment wherein a battery may be placed to power the light. The housing also includes a generator coupled through a common shaft to a specially balanced and mounted flywheel. Means are provided to spin or rotate the flywheel at a high speed through the application of a short burst of manual energy. Once spinning or rotating, the momentum of the flywheel keeps it rotating for a relatively long period of time compared to the time that the manual energy must be applied. The flywheeel thus provides through the shaft coupling a constant input of energy to the generator, which in turn, keeps the light burning. Either the battery or the flywheel driven generator may be used to power the light.

The flashlight housing may be either straight or elbow-headed. The body of the flashlight housing is advantageously configured to be easily gripped by the hand of a user. The portion of the housing in which the flywheel is mounted is typically of a larger diameter than the other portions of the housing, thereby providing a stop or wall against which a user's hand can be placed to improve his or her grip on the flashlight. The application of short bursts of manual energy to the flywheel is easily facilitated through the use of levers or other devices that may be operated with the fingers or thumb of the user's hand. A specially adapted ratchet mechanism allows the flywheel to be driven or rotated in one direction when external manual energy is applied, and allows it to freely spin in the same direction when the external manual energy is not applied. Because the flywheel is specially balanced and mounted so as to provide a low-friction, high-inertia device, the rotational speed thereof may be maintained at a sufficiently high rpm through the application of only occasional bursts of external manual energy. In certain instances, whenever it may not be desirable or permissable to operate the generator portion of the flashlight, an auxiliary battery is provided which can be easily switched on by pushing or pulling a button or other switch.

BRIEF DESCRIPTION OF THE DRAWINGS

The above and other objects, features, and advantages of the invention will be more apparent from the following more particular description presented in connection with the accompanying drawings, in which.

DESCRIPTION OF THE PREFERRED EMBODIMENTS

The invention is best understood by reference to the figures wherein like parts are designated with like numerals throughout.

Figure 1:
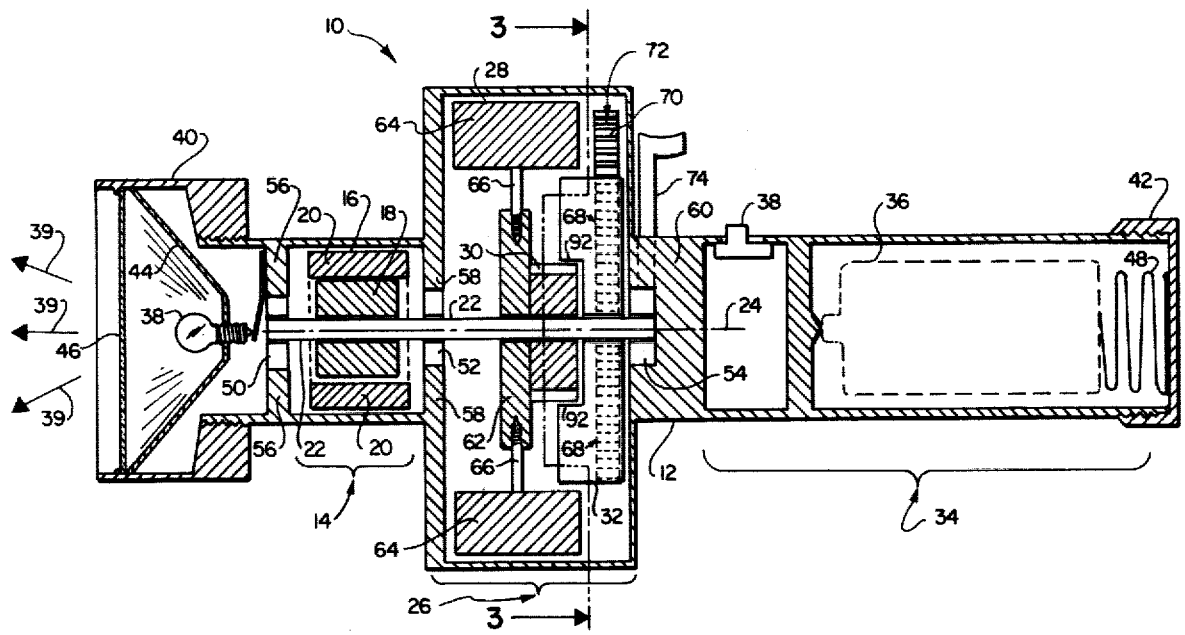
FIG. 1 is a cross-sectional view of an exemplary self-generating hand-held flashlight built according to the principles of the present invention showing the basic elements thereof.

In FIG. 1, a cross-sectional view of a self-generating hand-held flashlight built according to the principles of the present invention is shown. It is to be understood that numerous modifications could be made to the structure shown in FIG. 1, the structure being exemplary of numerous ways and methods wherein the basic components of the invention could be combined. Shown generally at 10 is a flashlight that includes a tubular housing 12 divided into three main compartments. A first compartment, shown at 14, includes a small generator 16. The generator 16 includes a permanent magnet armature 18 surrounded by appropriate coils of wire 20. The armature 18 is coupled to a rotatable shaft 22 adapted to rotate about a central axis 24.

A second compartment 26 of the flashlight 10 includes a flywheel 28, a slant-tooth gear 30, and a power drive wheel 32. Each of these items are also adapted to rotate about the central axis 24, both the flywheel 28 and the slant-tooth gear 30 being rigidly coupled to the rotatable shaft 22, and the power wheel 32 being free to rotate thereabout.

A third compartment 34 of the tubular housing 12 includes space into which a battery 36 may be inserted. A switch 38 allows a user of the flashlight 10 to select either a selfgenerating mode of operation or the battery mode of operation. The inner connecting wires between the generator 16 and the battery 36 to a flashlight bulb 38 are not shown in the figure. These electrical connections are made in conventional manner.

The tubular housing 12 is adapted at both ends thereof to receive a front end portion 40 at one end and a rear cap 42 at the other end. These items are typically threaded and adapted to be screwed onto their respective locations of the housing 12. The front portion 40 includes a reflector 44 and a front lens 46 in conventional fashion. The rear cap 42 may include a conductive spring 48 adapted to securely hold a battery 36, when used, in its proper position.

The rotatable shaft 22 typically extends through both the compartments 14 and 26. It is centrally mounted within the tubular housing 12 along axis 24 by means of bearings 50, 52, and 54. These bearings are typically inserted in solid wall portions 56, 58, and 60, respectively, of the tubular housing 12. However, any suitable mounting of the bearings could be employed. Moreover, the bearing 52, as well as the wall portion 58 may be removed without affecting the performance of the flashlight 10. This is because the bearings 50 and 54 still remain to securely hold the rotatable shaft 22 in its desired location.

As will be more apparent from the description which follows, the flywheel 28 is rotated through the application of manual energy to the power wheel 32. Rotation of the power wheel 32 is coupled to the flywheel 28, in turn, by means of a "slip-clutch" which includes the slant-tooth gear 30. The "slip-clutch" functions much as a conventional ratchet mechanism. That is, rotational energy of the power wheel 32 is coupled to the flywheel 28 whenever the angular speed of the power wheel 32 in a specified direction exceeds that of the flywheel 28 in the same direction. However, if the angular speed of the power wheel 32 is less than the angular speed of the flywheel 28, then the flywheel 28 is free to rotate without being coupled to the power wheel 32.

The flywheel 28 advantageously includes a high density material around the circumference thereof. In FIG. 1, for example, the flywheel 28 is shown as being made up of a circular disc 62 to which an annular ring 64 has been attached by means of spokes 66. The annular ring 64 is ideally made from steel or iron (or other suitable materials having a high density) so that the major portion of the mass of the flywheel 28 lies at a maximum radius from its axis of rotation 24. Locating the significant mass in this fashion greatly increases inertia of the flywheel, thereby allowing it to spin or rotate for a maximum period of time once rotational energy has been initially imparted thereto.

Manual rotational energy may be coupled to the power wheel 32 through various means and methods. As shown in FIG. 1, power wheel 32 typically includes a set of teeth, grooves, or similar indentations placed around the circumference thereof. These are shown generally at 68, and are shown in phantom because they would appear on the back side of the cross section shown. A sliding bar 70, or other similar member, also includes a corresponding set of teeth, grooves, or other indentations shown generally at 72. The sliding member 70 is rigidly connected to a manual control lever 74 which extends out from the tubular housing 12 of the flashlight 10. By exerting a manual force on the lever 74 in a downward direction (as the flashlight 10 is oriented in FIG. 1) the sliding member 70 is likewise caused to move in a downward direction. The teeth, grooves, or indentations 72 of the member 70 engage with the teeth, grooves, or indentations 68 of the power wheel 32, thereby causing the power wheel 32 to rotate. That is, the downward movement of the manual lever 74 places a tangential force at the circumference of the power wheel 32, which tangential force causes the wheel 32 to rotate. A spring return mechanism (not shown in FIG. 1) is typically employed with the manual lever 74 in order to return this lever to its rest or standby position.

In operation, a user of the flashlight 10 grips the tubular housing 12 with one hand in the area shown generally at 34. A thumb or finger is used to manipulate the lever 74 thereby causing the power wheel 32 to rotate. A single stroke, or multiple strokes of the lever 74 may be imparted to the lever 74 in order to impart a desired angular velocity to the power wheel 32. As the power wheel 32 begins to rotate, the "slip-clutch" mechanism, which includes the slant-tooth gear 30, couples this rotation to the flywheel 28. As the flywheel 28 rotates, the rotatable shaft 22 also rotates and causes the armature 18 of the generator 16 to likewise rotate. The moving magnetic field created by the rotating armature 18 thus induces a voltage in the coils 20 of the generator 16 according to well known principles of electromagnetic induction. The voltage thus generated is used to power the bulb 38, thereby causing a beam of light 39 to be transmitted out from the front side of the reflector 44. The high inertia flywheel 28, once rotating, allows the generator 16 to continue generating electricity for a substantial period of time after the input of manual energy to the system through lever 74 has terminated. Thus, a user of the flashlight 10 need only pump the lever 74 for a short period of time and a light will be produced for a relatively long period of time. Thus, the user need not continuously pump the lever 74 in order to obtain a continuous light. Rather, he need only pump the lever 74 long enough to bring the flywheel up to speed (which should only take a few seconds) following which a light will be produced for tens of seconds or even minutes. From a time ratio point of view, the invention herein disclosed yields at least a five to one ratio. That is, if manual energy is inputted into the flashlight for five seconds, then the light will burn for twenty-five seconds. This ratio is believed by the inventor to be far superior to any prior art self-generating flashlights. Moreover, by careful selection of the materials used within the flashlight 10, a ratio of available light time to energy input time of greater than 10 to 1 is achievable.

Figure 2:
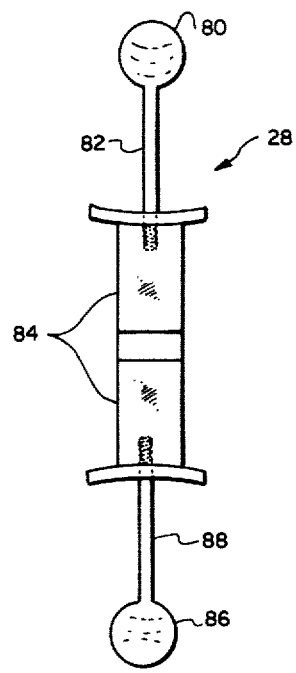
FIG. 2 is a side view of an alternative embodiment of the flywheel of FIG. 1.

Shown in FIG. 2 is an alternative embodiment of the fly-wheel 28. The configuration of FIG. 2 is of the "drum stick" type wherein a weight is attached to a supporting arm or spoke 82 which, in turn, is screwed into a circular hub 84. To insure the balancing of such a wheel, a similar weight 86 is screwed into the hub 84 by means of a spoke or support 88 so as to be diametrically opposite that of the weight 80. As with the configuration of the flywheel shown in FIG. 1, the flywheel of FIG. 2 employs a high density material for the weights 80 and 86, whereas the hub 84 may be a relatively low density material, such as plastic. The weights 80 and 86 could illustratively be steel balls.

Figure 3:
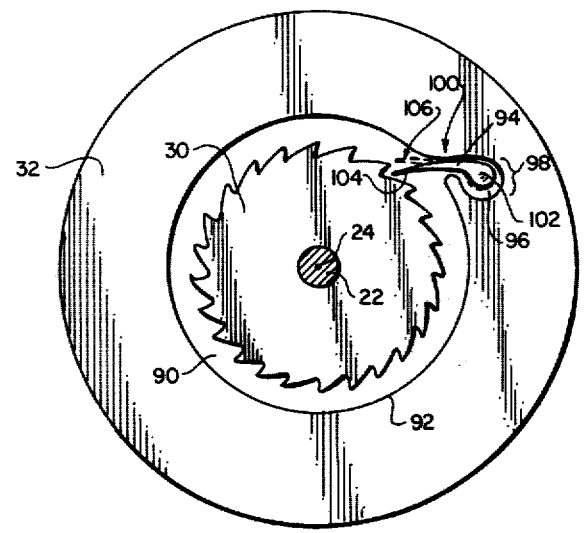
FIG. 3 is a sectional view taken along the line 3—3 of FIG. 1.

The details of the "slip-clutch", or ratchet mechanism, are disclosed in FIG. 3. This figure is a sectional view taken along the line 3—3 of FIG. 1. It should be noted that FIG. 3 is only a partial sectional view in that the sliding member 70 is not shown therein. The power wheel 32 has a center portion partially cut away therefrom, thereby defining a cavity 90 into which a portion of the slant-tooth gear 30 may extend. The cavity 90 is defined by a circular wall 92 which extends into the power wheel 32 for a specified depth. A pawl 94 is inserted into a second cavity or recession 96. This cavity 96 is at a specific point along the circular wall 92. The cavity 96 includes a large main portion 98 and narrow neck portion 100. The narrow neck portion 100 connects with the circular wall 92, thereby providing communication from the large circular cavity 90 to the main portion 98 of the smaller cavity 96.

The pawl 94 includes a head portion 102 that is of larger dimensions than the narrow neck portion 100 of the cavity 96. Thus, when the pawl 94 is inserted into the cavity 96 as shown in FIG. 3, it is locked therein, although it is free to move about within the confines defined by the cavity structure. Should the angular speed of the power wheel 32 in a counter-clockwise direction (as viewed in FIG. 3) exceed that of the slant-tooth gear 30, then the tip 104 of the pawl 94 is forced by rotational and gravitational forces to become engaged with the teeth of the gear 30. With the tip 104 thus engaged, any rotation of the power wheel 32 in a counter-clockwise direction is coupled to the slant-tooth gear 30. As soon as the angular speed of the power wheel 32 becomes less than that of the slant-tooth gear 30 in the counter-clockwise direction, then the tip 104 of the pawl 94 is forced out away from the slanted teeth, as shown best by the dotted lines at 106. The gear 30, as well as the central shaft 22, and anything else connected thereto (such as the flywheel and generator), are thus free to rotate in the counter-clockwise direction without interferance from the pawl 94. It is significant to note that as shown in FIG. 3, there are no springs or other biasing means used to force the tip 104 of the pawl 94 to become engaged with the teeth of the gear 30. Such engagement occurs automatically whenever the angular speed of the power wheel exceeds that of the gear 30 due to the gravitational and rotational forces involved.

Figure 4A:
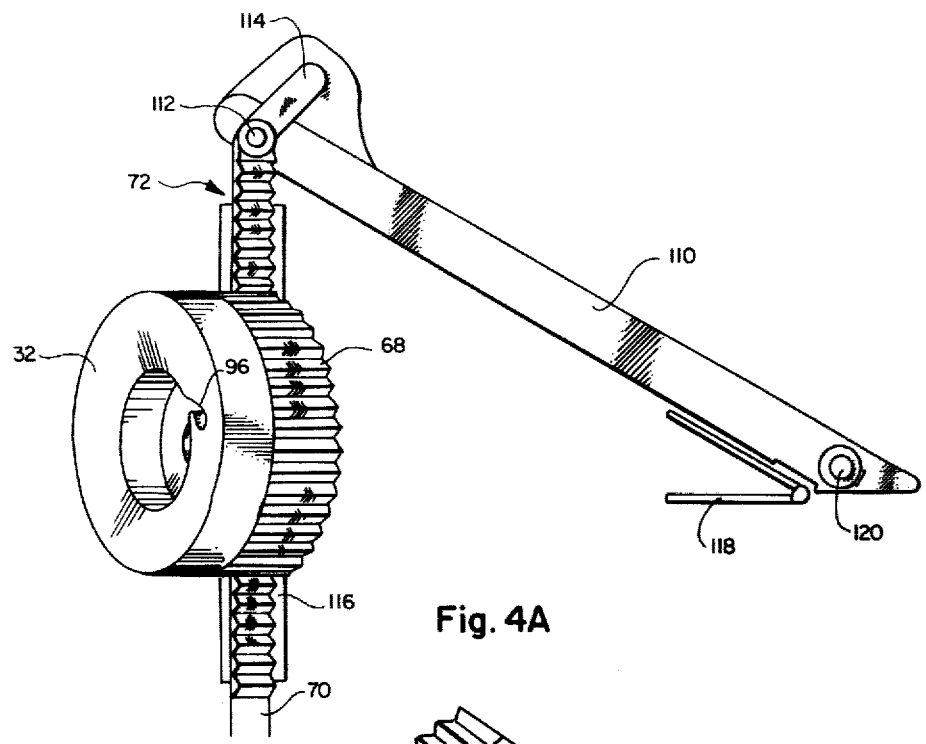
FIGS. 4A and 4B teach alternative concepts for rotating the power wheel of FIG. 1 using a manually operable lever.
Figure 4B:
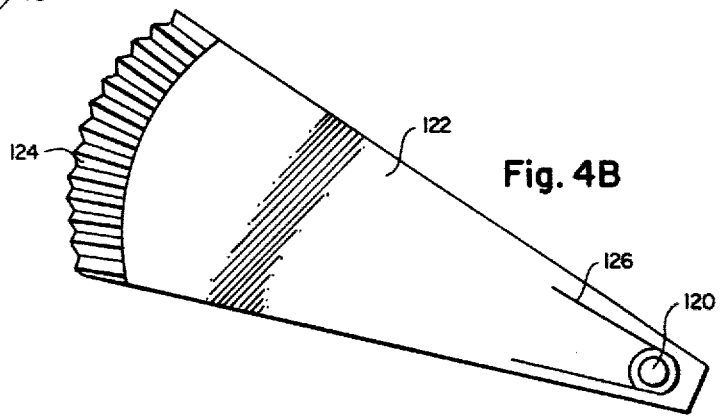

FIG. 4A illustrates another way of rotating the power wheel 32. A lever 110 is squeezed down and the teeth, grooves, or indentations 72 of the sliding member 70 meshes with the like teeth, grooves, or indentations 68 of the power wheel 32. A rivot or screw 112 moves gradually upward within the space 114 as the lever 110 is squeezed down on a sheath 16, thus permitting a smooth downward movement of the lever 110. A spring 118 returns the lever 110 to its original position after it has been manually pushed down. The lever 110 may be pivotally mounted to the case 12 of the flashlight 10 with a suitable rivot or screw 120.

As an alternative to the use of lever 110, a curve ended lever 122 provided with teeth, grooves, or indentations 124 that mesh with the teeth, grooves, or indentations 68 of the power wheel 32 may be used. A spring 126 enables the lever 122 to return to its original position.

Figure 5A:
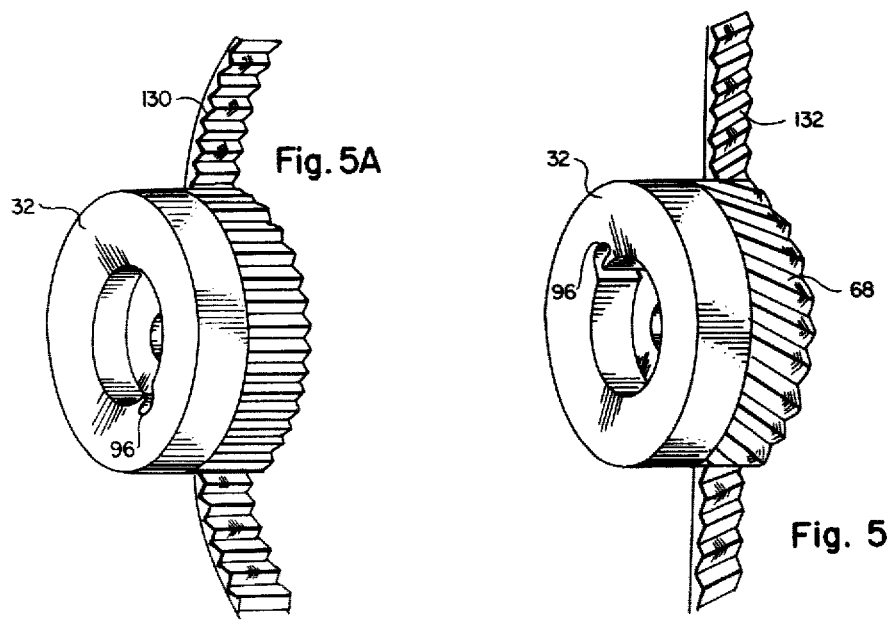
FIGS. 5A and 5B likewise teach alternative methods for rotating the power wheel of FIG. 1 using grooved belts, bands, or similar sliding members.
Figure 5B:
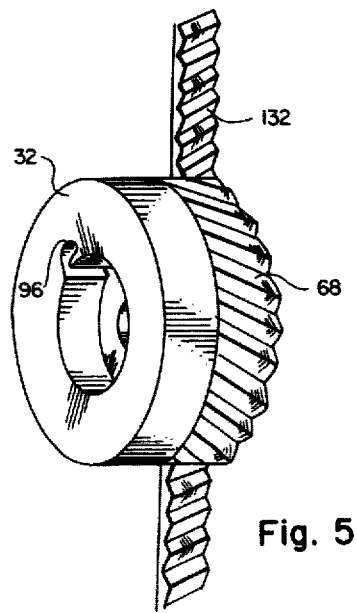

An alternative mode for rotating the power wheel 32 is shown in FIG. 5A. A plastic or other similar belt 130 is adapted to mesh with the teeth, grooves, or indentations of the power wheel 32. The belt 130 is merely pulled down to rotate the power wheel 32, which in turn rotates the flywheel 28. FIG. 5B is merely a further alternative design of the system used to rotate the power wheel 32. A belt or a screw 32 designed to mesh with the wheel 32 is used to rotate the power wheel 32. In this case, the grooves, teeth, or indentations 68 of the wheel 32, as well as those of the belt or screw 132, are typically slanted as shown.

Figure 6:
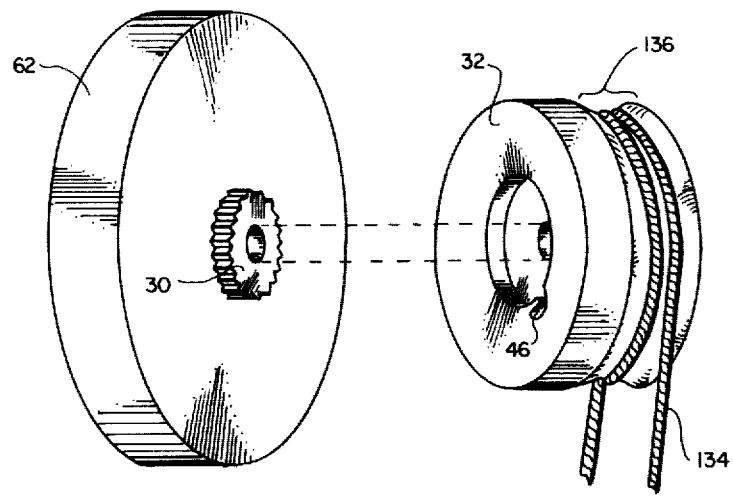
FIG. 6 shows in perspective a flywheel, slant-toothed gear, and power wheel in juxtaposition teaching yet another method of manually rotating the power wheel.

FIG. 6 shows still another alternative method of rotating the power wheel 32 by means of a pull cord 134. The pull cord 134 could advantageously exit from the tubular case 12 at a convenient location. The power wheel 32 could include a spring mechanism (not shown) adapted to rewind the cord 134 on a pulley portion 136 of the wheel 32 after it has been pulled.

Figure 7:
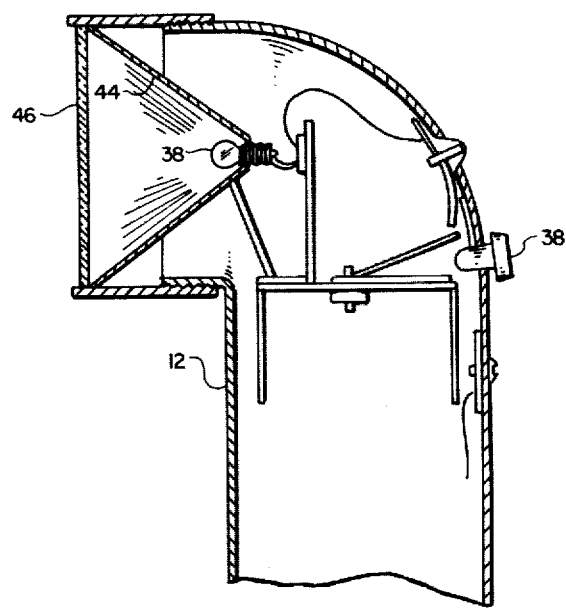
FIG. 7 shows an alternative configuration for the flashlight housing.

An alternative configuration for the casing 12 of the flashlight would include an elbow head as shown in FIG. 7.

While the invention herein disclosed has been described by means of specific embodiments and applications thereof, numerous modifications and variations could be made thereto by those skilled in the art without departing from the spirit and scope of the present invention. It is therefore to be understood that within the scope of the appended claims, the invention may be practiced otherwise than as specifically described herein.

I claim:
1. A self-generating hand-held flashlight comprising:
 a tubular housing having first and second coaxial compartments, said second compartment having a diameter that is at least 1.5 times as large as the diameter of said first compartment;

a bulb mounted in a reflector plate positioned at one end of said housing;

a generator positioned in said first compartment of said housing, said generator having a rotor adapted to rotate about a central axis of said tubular housing and said generator being electrically coupled to said bulb;

a high inertia balanced flywheel rotatably mounted in said second compartment about said central axis, said flywheel being directly coupled through a central rotatable shaft to said rotor of said generator, said flywheel having a diameter at least 1.4 times as large as the diameter of said first housing;

manual means for coupling a burst of rotational energy to said flywheel, said means including a slip-clutch adapted to couple said flywheel to externally applied manual energy during an excitation period, and for de-coupling said flywheel from externally applied manual energy during a non-excitation period; and a plurality of bearings selectively positioned along said shaft for holding said shaft in its desired central position and for minimizing frictional and other losses associated with the rotation of said flywheel, shaft, and rotor of said generator, thereby allowing said flywheel, shaft, and generator rotor to rotate for a relatively long period of time after the application of a short burst of manual rotational energy to said flywheel through said manual means;

whereby said flashlight provides a continuous source of light over both said excitation and non-excitation periods, said non-excitation period being at lease four times as long as said excitation period.

2. A self-generating hand-held flashlight as defined in claim 1 wherein said non-excitation period is at least nine times as long as said excitation period.

3. A self-generating hand-held flashlight as defined in claim 1 further including a third compartment within said tubular housing that is coaxial with said first and second compartments, said third compartment being adjacent to said second compartment and having a diameter that allows it to be conveniently held in the fingers and palm of a hand.

4. A self-generating hand-held flashlight as defined in claim 3 wherein said balanced flywheel comprises:
a circular hub made from a first material having a hole through the center therefore through which said central rotatable shaft passes;
means for rigidly connecting said rotatable shaft to said hub whereby one revolution of said hub causes one revolution of said shaft; and
a plurality of weights made from a second material symetrically attached to the outer periphery of said hub.

5. A self-generating hand-held flashlight as defined in claim 4 where said first material is a low density material, such as plastic, and said second material is a high density material, such as steel.

6. A self-generating hand-held flashlight as defined in claim 5 wherein said manual means for coupling rotational energy to said flywheel comprises:
a power wheel positioned adjacent to said flywheel within said second compartment and adapted to rotate about said central axis;
said slip-clutch positioned between said power wheel and said flywheel, said slip-clutch adapted to couple the rotation of said power wheel to said flywheel whenever the angular speed of said power wheel in a specified direction exceeds the angular speed of said flywheel in said same specified direction; and
excitation means for rotating said power wheel in said specified direction with externally applied manual energy.

7. A self-generating hand-held flashlight as defined in claim 6 wherein said slip-clutch comprises:
a slant-tooth gear rigidly attached to said rotatable shaft;
an engaging pawl coupled to said power wheel and adapted to securely engage the teeth of said slant tooth gear, thereby allowing motion of said power wheel to be imparted to said rotatable shaft in one direction only, and further allowing said rotatable shaft to freely rotate in said one direction whenever said power wheel is rotating at an angular speed less than said rotatable shaft.

8. A self-generating hand-held flashlight as defined in claim 7 wherein said engaging pawl and coupling thereof to said power wheel comprises:
a finger having a body and first and second ends, said first end concavely slanting towards the axis of rotation of said slant-tooth gear and said second end having a head of larger dimensions than said finger; and
means for loosely coupling said head of said finger to an area of said power wheel that allows the first end of said finger to engage said slant-tooth gear when the power wheel is positioned adjacent thereto, said means including:
a first recessed area centrally placed on one side of said power wheel into which said slant tooth gear may fit without touching the power wheel; and
a second recessed area placed at one point around the periphery of said first recessed area, said second recessed area having a narrow channel portion connecting said first recessed area to a main portion of said second recessed area, said narrow channel and main portions being adapted to allow said finger to loosely fit within said second recessed area so that the head of said finger remains in the main portion of the second recessed area, and to further allow the body of said finger to pass through said narrow channel portion, thereby allowing the first end of said finger to protrude into said first recessed area and make contact with said slant-tooth gear.

9. A self-generating hand-held flashlight as defined in claim 8 wherein the secured engagement of said pawl with said slant-tooth gear is realized through the use of gravitational and rotational forces.

10. A self-generating hand-held flashlight as defined in claim 3 wherein said first compartment of said tubular housing includes an elbow at one end thereof, said reflector plate being positioned in said elbow-headed end, thereby allowing said flashlight to cast a beam of light out from said tubular housing at approximately right angles to said housing.

11. A self-generating hand-held flashlight as defined in claim 6 wherein said excitation means comprises:
symmetrically spaced indentures placed around the circumference of said power wheel; and means for engaging said symetrically spaced indentures with a manual tangential force, thereby causing said power wheel to rotate.

12. A self-generating hand-held flashlight as defined in claim 11 wherein said engagement means comprises:

an arm having a set of equispaced indentures adapted to come in contact and mesh with a portion of said symmetrically spaced indentures of said power wheel;

pivotal mounting means for pivotally securing one end of said arm to said tubular housing, the other end of said arm being free to move back and forth; and spring return means for returning said arm to a rest position, said arm being adapted to rotate said power wheel when manually moved from said rest position.

13. A self-generating hand-held flashlight as defined in claim 11 wherein said engagement means comprises:

an arm having a set of equispaced indentures adapted to come in contact and mesh with a portion of said symmetrically spaced indentures of said power wheel;

sliding mounting means for tieing said arm to said tubular housing and holding the arm so that a portion of it is maintained in contact with said power wheel, said sliding mounting means allowing said arm to linearly slide back and forth, the linear motion of said arm being coupled to the circumference of said power wheel through said meshed indentures, thereby causing said power wheel to rotate; and spring return means for returning said arm to a rest position.

14. A self-generating hand-held flashlight as defined in claim 6 wherein said excitation means comprises a pull-cord wrapped around a circumferential portion of said power wheel.

15. A self-generating hand-held flashlight as described in claim 3 further including battery means within said third compartment for allowing a battery to selectively energize said bulb, said battery means being switchably connected to said bulb through suitable electrical conductors.

* * * * *